A. S. HARRIS.
WICKET TRAP.
APPLICATION FILED OCT. 24, 1910.
986,977.
Patented Mar. 14, 1911.
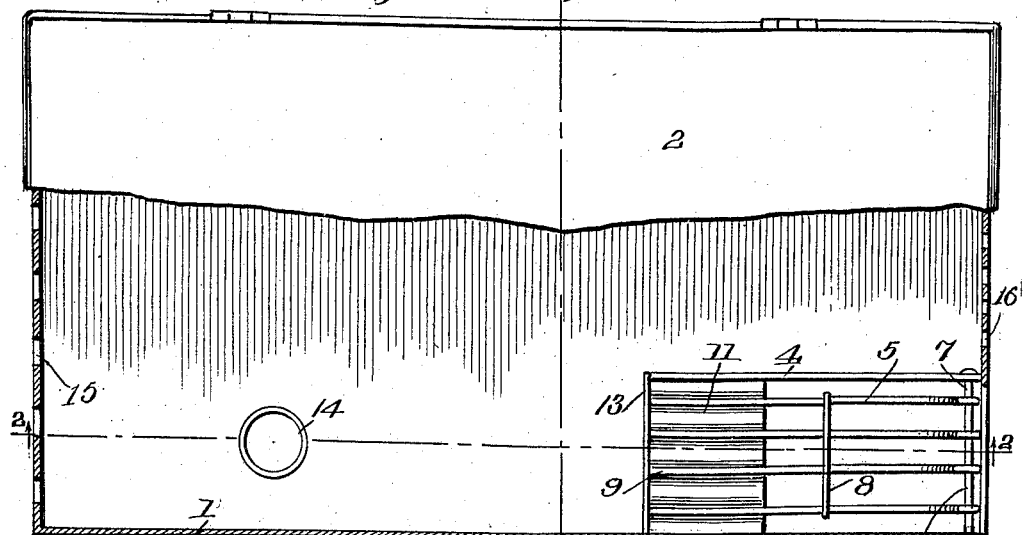
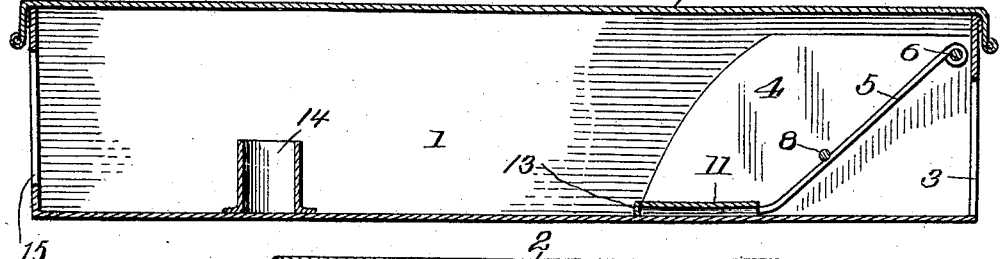
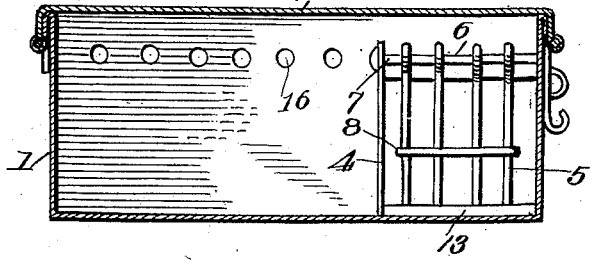
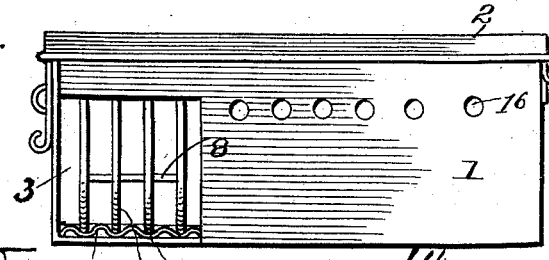
Inventor
A. S. Harris
Witnesses
Attorneys

UNITED STATES PATENT OFFICE.

AUGUSTUS S. HARRIS, OF HOPE, TERRITORY OF NEW MEXICO.

WICKET-TRAP.

986,977.                  Specification of Letters Patent.    Patented Mar. 14, 1911.

Application filed October 24, 1910. Serial No. 588,905.

*To all whom it may concern:*

Be it known that I, AUGUSTUS S. HARRIS, a citizen of the United States, residing at Hope, in the county of Eddy and Territory of New Mexico, have invented certain new and useful Improvements in Wicket-Traps; and I do hereby declare the following to be a full, clear, and exact description of the invention, such as will enable others skilled in the art to which it appertains to make and use the same.

This invention relates to improvements in traps for capturing mice, rats and other animals of the rodent species.

The object of the invention is to provide a trap into which the animals are enticed by food or water and prevented from escaping by means of a pivotally hung wicket before the entrance-opening.

Another object of the invention is to provide a trap in which the weight of the animal assists in holding down the wicket when attempting to escape.

A further object of the invention is to provide a trap of simple and inexpensive construction which readily admits the animal and positively prevents its escape.

In the accompanying drawings forming a part of this specification, and in which like characters of reference indicate corresponding parts, Figure 1 is a plan view of my trap with the cover removed, Fig. 2 is a sectional elevation taken on line 2—2 of Fig. 1. Fig. 3 is a transverse section taken on line 3—3 of Fig. 1, and Fig. 4 is an end view of the trap.

Referring to the drawings, 1 indicates a box, preferably constructed of sheet tin or metal, rectangular in form, having a hinged cover 2 secured thereto in any suitable manner. Near the corner at one end of the box is an entrance-opening 3, at the opposite side of which is a short vertical partition 4 extending longitudinally of the box.

Pivotally hung above the entrance-opening and inside of the box is a wicket, consisting of a plurality of wires 5, rigidly connected to a transverse bar 6, having its ends 7 journaled in apertures through the side of the box and in the partition 4. The wires 5 are more securely held in assembled relation by being soldered to a transverse bar 8, and have their lower ends bent at an angle with the main portion to provide feet 9, which rest in grooves 10 of a corrugated metal strip 11 fastened to the bottom of the box between the side of the box and the partition 4. A piece 13 may be attached to the end of the corrugated strip to further prevent the animal raising the wicket. Secured to the bottom of the box near the feet ends and in front of the entrance-opening 3 is a receptacle 14 for containing food or water to entice the animals into the trap.

Suitable openings, as the slits 15 and 16, are provided in the walls of the box to allow ventilation, as well as to light the interior, thus making it less suspicious appearing to an animal in the vicinity.

From the foregoing description it will be understood that the animal easily enters the trap by raising the pivotally hung wicket, which falls behind it. As the feet 9 fall in the grooves 10, the animal, in trying to escape, steps on the feet and thereby more securely prevents its escape.

Although the elements herein set forth are fully adapted to serve the intended purposes, it is understood that various changes in the form, proportion and minor details of construction may be resorted to without departing from the spirit of the invention.

Having fully described my invention, what I claim and desire to secure by Letters Patent is:

1. In an animal trap the combination of a box provided with an entrance-opening, a wicket pivoted above the opening inside of the box, inwardly extending feet on the wicket, and the bottom of the box provided with corrugations for receiving the feet of the wicket.

2. In an animal trap the combination of a box provided with an entrance-opening, a wicket pivoted above the opening inside of the box, inwardly extending feet on the wicket, the bottom of the box provided with corrugations for receiving the feet of the wicket, and a strip at the end of the corrugations to prevent the animal raising the wicket.

In testimony whereof I affix my signature in presence of two witnesses.

AUGUSTUS S. HARRIS.

Witnesses:
  SAM. G. DAVIS,
  CALLIE DORIES.

Copies of this patent may be obtained for five cents each, by addressing the "Commissioner of Patents, Washington, D. C."